United States Patent
Curiel

(10) Patent No.: US 10,361,030 B2
(45) Date of Patent: Jul. 23, 2019

(54) START CAPACITOR ASSEMBLIES AND METHODS FOR OPERATING ELECTRIC MOTORS

(75) Inventor: Francisco Javier Curiel, Juarez (MX)

(73) Assignee: NUEVA GENERACION MANUFACTURAS S.A. DE C.V., Mexico (MX)

( * ) Notice: Subject to any disclaimer, the term of this patent is extended or adjusted under 35 U.S.C. 154(b) by 467 days.

(21) Appl. No.: 13/586,674

(22) Filed: Aug. 15, 2012

(65) Prior Publication Data

US 2014/0049205 A1 Feb. 20, 2014

(51) Int. Cl.
| | |
|---|---|
| H02P 1/42 | (2006.01) |
| H01G 2/14 | (2006.01) |
| H02P 1/44 | (2006.01) |
| H01G 4/32 | (2006.01) |
| H01G 4/224 | (2006.01) |

(52) U.S. Cl.
CPC .............. *H01G 2/14* (2013.01); *H01G 4/224* (2013.01); *H01G 4/32* (2013.01); *H02P 1/44* (2013.01)

(58) Field of Classification Search
USPC ........ 318/785, 751, 794, 795, 796, 817, 753
See application file for complete search history.

(56) References Cited

U.S. PATENT DOCUMENTS

| | | | |
|---|---|---|---|
| 3,644,810 A * | 2/1972 | Lewus | H02P 1/44 318/787 |
| 4,813,116 A * | 3/1989 | Thiel | H01G 4/228 29/25.42 |
| 5,162,718 A * | 11/1992 | Schroeder | 318/794 |
| 5,512,810 A * | 4/1996 | Hansen et al. | 318/800 |
| 5,561,357 A * | 10/1996 | Schroeder | 318/789 |
| 5,714,861 A * | 2/1998 | Hansen et al. | 318/799 |
| 5,883,486 A * | 3/1999 | Earhart et al. | 318/778 |
| 6,014,308 A | 1/2000 | Stockman | |
| 7,050,287 B2 * | 5/2006 | Bauer | 361/301.3 |
| 7,203,053 B2 | 4/2007 | Stockman | |
| 7,423,861 B2 | 9/2008 | Stockman | |
| 7,474,519 B2 | 1/2009 | Stockman | |
| 7,835,133 B2 | 11/2010 | Stockman | |
| 8,179,083 B2 * | 5/2012 | Cecconi | 318/778 |
| 2002/0140396 A1 * | 10/2002 | Puppin et al. | 318/778 |
| 2006/0056133 A1 * | 3/2006 | Bauer | 361/301.3 |
| 2006/0097687 A1 * | 5/2006 | Byrnes, Jr. | H02P 1/44 318/751 |
| 2010/0052600 A1 * | 3/2010 | Cecconi | 318/795 |

(Continued)

OTHER PUBLICATIONS

An advertisement for AmRad's Turbo Easy-Start™ "4", retrieved from website http://www.americanradionic.com/content/view/122/44 on Feb. 13, 2013 (2 pgs).

(Continued)

*Primary Examiner* — Eduardo Colon Santana
*Assistant Examiner* — Iftekhar Mustafa
(74) *Attorney, Agent, or Firm* — Duane Morris LLP

(57) ABSTRACT

Start capacitor assemblies and methods for operating electric motors are described. In one example, a start capacitor assembly for connection to an electric motor includes a film capacitor and a resistor. The film capacitor has a first terminal and a second terminal. The resistor is coupled to the film capacitor in parallel with the first terminal and the second terminal of the film capacitor

16 Claims, 4 Drawing Sheets

(56) References Cited

U.S. PATENT DOCUMENTS

| 2011/0115448 | A1* | 5/2011 | Elliott | H05B 37/0254 |
| | | | | 323/235 |
| 2011/0134584 | A1* | 6/2011 | Stockman | H01G 5/38 |
| | | | | 361/328 |
| 2011/0193490 | A1* | 8/2011 | Kumar | H05B 39/044 |
| | | | | 315/246 |

OTHER PUBLICATIONS

"AmRad Engineering Introduces Universal Turbo Easy-Start 2TM," HVAC Insider Great Lakes Edition, vol. 22 No. 06, Jul. 2012, p. 4.

* cited by examiner

START CAPACITOR ASSEMBLIES AND METHODS FOR OPERATING ELECTRIC MOTORS

BACKGROUND OF THE INVENTION

This invention relates generally to electric motors, and more specifically, to start capacitor assemblies and methods for operating electric motors.

Some known types of electric motors, sometimes also referred to as dynamoelectric machines, include a start winding and a run winding. The start winding is utilized to initiate rotation of the motor rotor. When the run and start windings are energized, the phase relationship between magnetic fields generated by the run and start windings, and the magnetization of the rotor, cause the rotor to begin rotating from a standstill condition. Once the rotor has sufficient torque to attain its normal running speed, the start winding is typically "switched out" of the motor circuit. In some other motors, the start winding is not switched out of the motor circuit.

Start capacitors sometimes are utilized to change the time phase relationship between the magnetic fields generated by the start windings. A start capacitor connected in series circuit with the start winding causes the magnetic field generated by the start winding to be out of phase with the run winding field by a greater degree. The greater phase shift of the start winding magnetic field results in a higher starting torque. A disconnection device, such as a centrifugal switch or a current sensing device, typically disconnects the start capacitor once the motor reaches full operating speed.

Start capacitors are commonly electrolytic capacitors. Electrolytic capacitors exhibit relatively high electrical losses that results in relatively high operating temperatures that may decrease reliability of the capacitor. To avoid overheating and damaging electrolytic start capacitors, some electric motors are designed to ensure that the electrolytic start capacitor is disconnected after no more than 2.5 seconds. The high electrical losses and heat generation of electrolytic start capacitors may also be of concern in applications in which a motor is cycled on and off fairly quickly because there may be insufficient time for the electrolytic start capacitor to dissipate the heat generated during startup of the motor.

BRIEF DESCRIPTION OF THE INVENTION

In one embodiment, a start capacitor assembly for connection to an electric motor includes a film capacitor and a resistor. The film capacitor has a first terminal and a second terminal. The resistor is coupled to the film capacitor in parallel with the first terminal and the second terminal of the film capacitor.

In another embodiment, an electric motor assembly includes an electric motor and a start capacitor assembly. The electric motor includes a start winding. The start capacitor assembly is coupled to the start winding of the electric motor. The start capacitor assembly includes a film capacitor having a first terminal and a second terminal, and a resistor coupled to the film capacitor in parallel with the first terminal and the second terminal of said film capacitor.

In another embodiment, a method of operating an electric motor having a start winding and a run winding is described. The method includes connecting a start capacitor assembly to the start winding of the electric motor in series with the start winding. The start capacitor assembly includes a film capacitor coupled in parallel to a resistor.

DETAILED DESCRIPTION OF THE INVENTION

Figure 1:
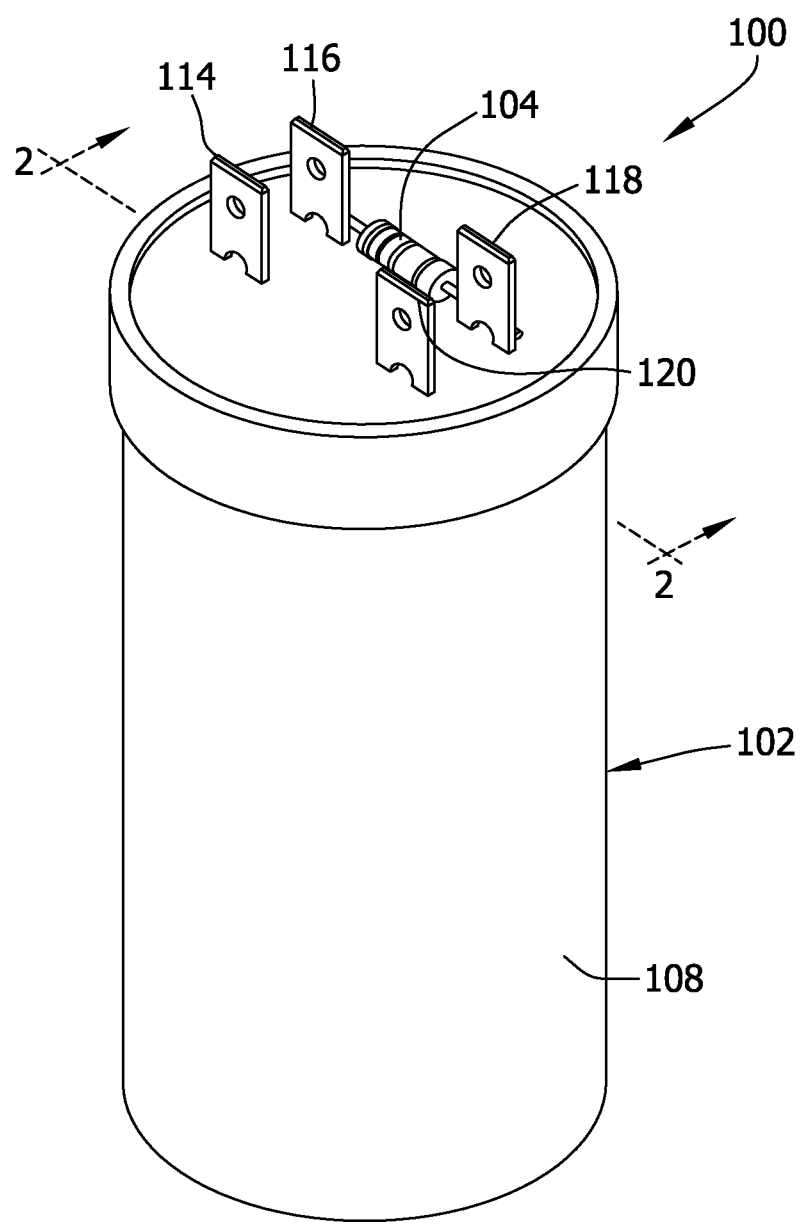
FIG. 1 a start capacitor assembly in accordance with the present disclosure.
Figure 2:
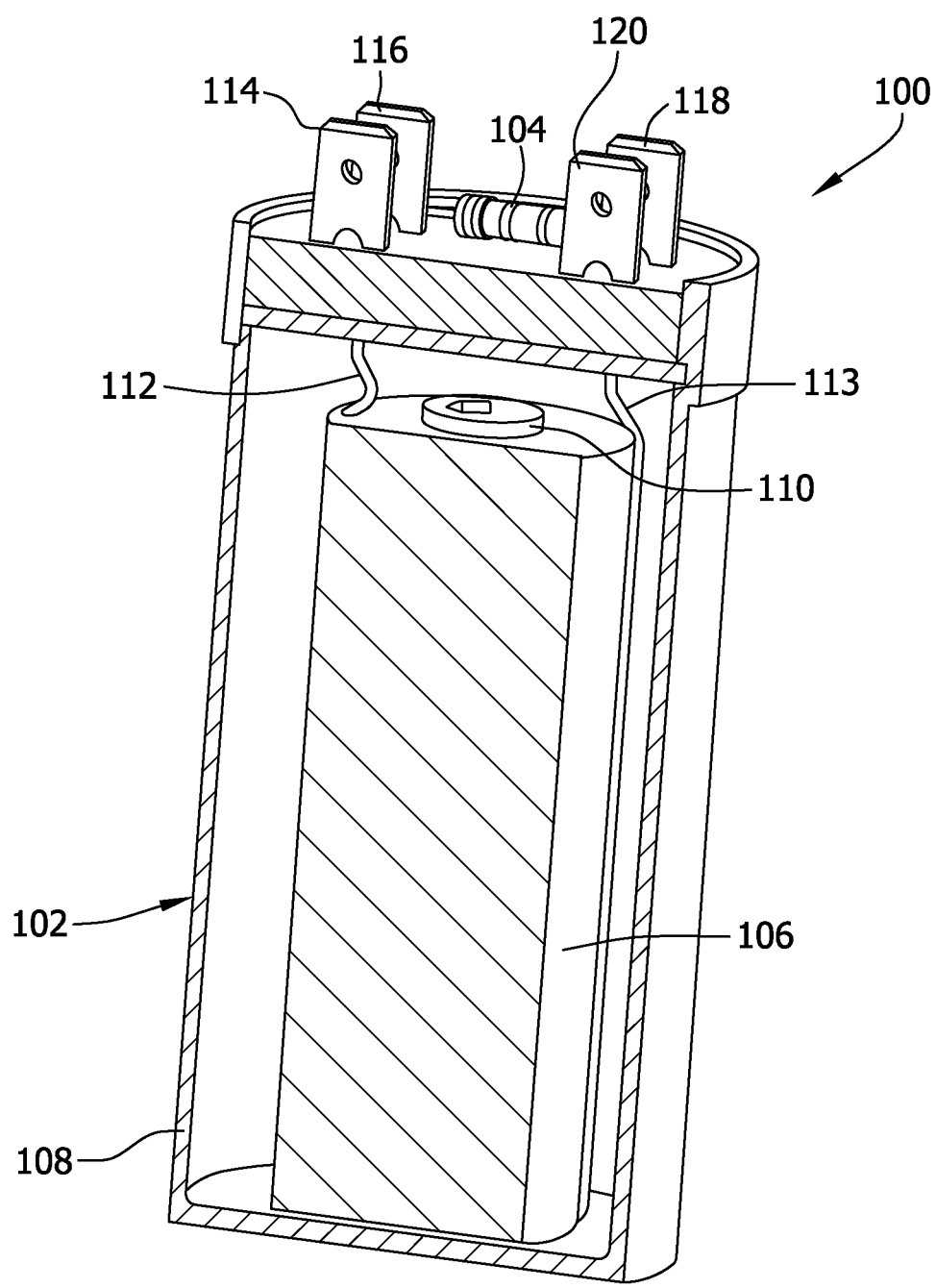
FIG. 2 is a cross section of the start capacitor assembly shown in FIG. 1 taken along the line 2-2.

FIG. 1 is an isometric view of an exemplary start capacitor assembly 100 for connection to an electric motor. FIG. 2 is a cross-sectional view of start capacitor assembly 100 taken along the line 2-2 shown in FIG. 1. Start capacitor assembly 100 includes a capacitor 102 and a resistor 104.

In the exemplary embodiment, capacitor 102 is a film capacitor. More specifically, the example capacitor 102 is a metalized film capacitor. Even more specifically, the exemplary capacitor 102 is a metalized film cylindrically wound capacitor. In other embodiments, capacitor 102 may be any other suitable type of film capacitor.

Capacitor 102 includes a cylinder 106 positioned within a housing 108. Cylinder 106 includes metalized film (not shown) cylindrically wound on a plastic core 110. In some embodiments, the space between cylinder 105 and housing 108 is filled with an insulating fluid. The metalized film wound on core 110 includes a thin layer of metal deposited on an insulating film substrate. The deposited metal forms the electrodes of capacitor 102, while the insulating film substrate is the dielectric. Lead wires 112 and 113, which may also be referred to as terminals, are coupled to the electrodes formed in cylinder 106. Four connection terminals 114, 116, 118, and 120 for coupling capacitor 102 to an electric motor extend from housing 108. Lead wires 112 and 113 are connected to connection terminals 114, 116, 118, and 120. More specifically, lead wire 112 is coupled to connection terminals 114 and 116, and lead wire 113 is coupled to connection terminals 118 and 120. In the exemplary embodiment, connection terminals 114-120 are quick-connect terminals. In some embodiments, connection terminals 114-120 are flying wire connections. In other embodiments, any other suitable connection terminals, including no terminals, may be used. Although the exemplary embodiment includes four connection terminals 114-120, other embodiments may include any suitable number and configuration of connection terminals. Moreover, although capacitor 102 has two electrodes and two lead wires 112 and 113, in other embodiments, capacitor 102 may include more than two electrodes and more than two lead wires 112 and 113. The capacitance selected for capacitor 102 may vary according to the electric motor with which start capacitor assembly will be used. The capacitance of capacitor 102 will generally be greater than the capacitance of a run capacitor for use in the same electric motor (if the motor includes a run capacitor). In various embodiments, the capacitance of capacitor 102 may be any value suitable to provide a desired phase shift for a particular electric motor configuration.

Figure 3:
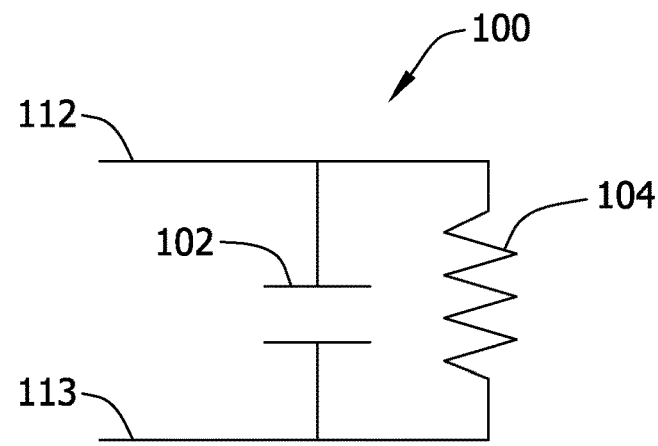
FIG. 3 is an diagram of the electrical equivalent of the start capacitor assembly shown in FIG. 1.

Resistor 104 is connected to capacitor 102 across connection terminals 116 and 118. Thus resistor 104 is coupled to capacitor 102 in parallel with lead wires 112 and 113. FIG. 3 is a schematic diagram of the electrical equivalent of capacitor assembly 100 showing capacitor 102 connected to resistor 104 in parallel. Resistor 104 facilitates discharging of capacitor 102 after disconnection of start capacitor assembly 100 from a start winding of an electric motor (not shown in FIGS. 1 and 2). Moreover, resistor 104 may help prevent damage to other motor components of a motor to which start capacitor assembly 100 is connected. The resistance selected for resistor 104 is determined based upon the capacitance and maximum RMS voltage across capacitor 102 as well as the minimum starting-stopping cycle of the motor to ensure capacitor 102 is substantially fully discharged before a next start of the electric motor. Additionally, the resistance of resistor 102 should be high enough to avoid the generation of too much heat by resistor 102 during operation.

Figure 4:
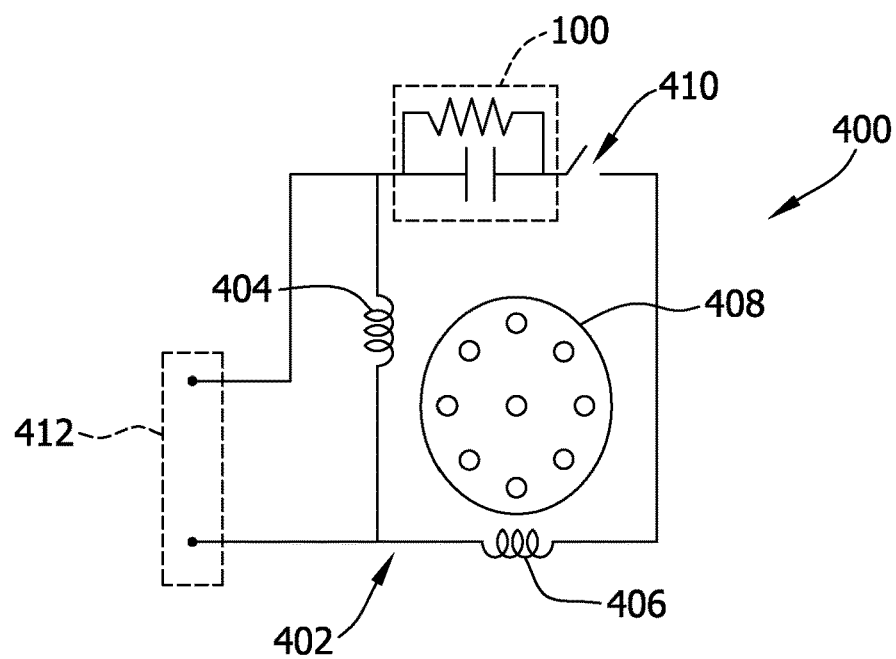
FIG. 4 is a simplified diagram of a capacitor start motor including the start capacitor assembly shown in FIG. 1.

FIG. 4 is a simplified diagram of an exemplary electric motor assembly 400. Motor assembly 400 includes an electric motor 402 and start capacitor assembly 100.

Electric motor 402 is a capacitor start motor and includes a run winding 404, a start winding 406, a rotor 408, a disconnect device 410, and a power input 412. Start capacitor assembly 100 is coupled to start winding 406 via disconnect device 410. When motor 402 is started, disconnect device 410 connects start capacitor assembly 100 in series with start winding 406. Power from input 412 is coupled to start winding 406 through start capacitor assembly 100. As understood by those of ordinary skill in the art, the capacitance provided by start capacitor assembly 100 creates a greater phase difference at start winding 406 than would otherwise be created, thereby increasing the torque generated on rotor 408. When motor 402 reaches its designed speed, disconnect device 410 disconnects start capacitor assembly 100 from start winding 406 and motor 402 continues to run without the extra torque provided by start capacitor assembly 100.

Figure 5:
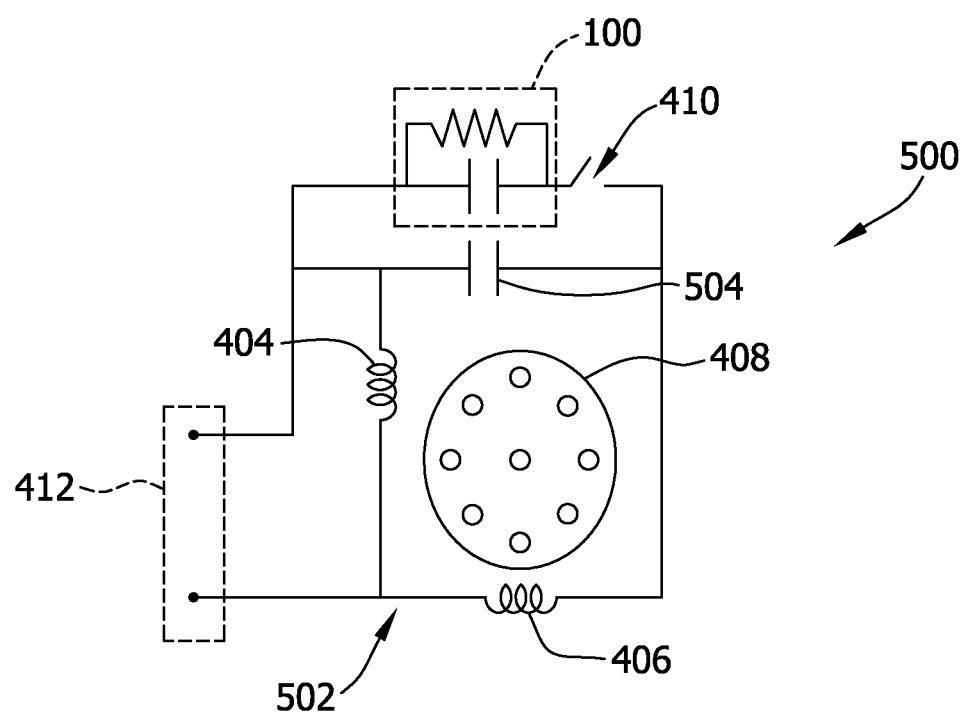
FIG. 5 is a simplified diagram of a capacitor start-capacitor run motor including a start capacitor assembly shown in FIG. 1.

FIG. 5 is a simplified diagram of an exemplary electric motor assembly 500. Motor assembly 500 includes an electric motor 502 and start capacitor assembly 100. Components that electric motor 502 has in common with electric motor 402 are identified by the same reference numbers.

Electric motor 502 is a capacitor start-capacitor run motor. Electric motor 502 includes run winding 404, start winding 406, rotor 408, disconnect device 410, and power input 412. Electric motor 502 also includes a run capacitor 504. Start capacitor assembly 100 and run capacitor 504 are coupled to start winding 406. Start capacitor assembly 100 is connected to start winding via disconnect device 410. When motor 502 is started, disconnect device 410 connects start capacitor assembly 100 in series with start winding 406. Power from input 412 is coupled to start winding 406 through start capacitor assembly 100 and run capacitor 504. As understood by those of ordinary skill in the art, the capacitance provided by start capacitor assembly 100 and run capacitor 504 creates a greater phase difference at start winding 406 than would otherwise be created, thereby increasing the torque generated on rotor 408. When motor 502 reaches its designed speed, disconnect device 410 disconnects start capacitor assembly 100, but not run capacitor 504, from start winding 406 and motor 502 continues to run without the extra torque provided by start capacitor assembly 100.

Electric motors 402 and 502 may be any suitable capacitor start or capacitor start-capacitor run motors, respectively. In some embodiments, electric motors 402 and 502 are induction motors. In some embodiments, electric motors 402 and 502 are permanent split capacitor (PSC) motors.

EXAMPLE 1

A start capacitor assembly was built in accordance with start capacitor assembly 100. Capacitor 102 was a metalized film capacitor having a capacitance of 175 microfarads. Resistor 104 had a resistance of 15,000 Ohms. The capacitor assembly was coupled to an Alternate Current (AC) circuit using contactor switches and a timing circuit. The testing was done using 230 Volts AC switched directly through the capacitors to simulate a motor start winding. The time between every start cycle was less than 20 seconds and the running time for each cycle was 2 seconds. The start capacitor assembly functioned in this test environment for more than 700,000 cycles without failure. When similar capacitance electrolytic capacitors, instead of the above described capacitor assembly, were subjected to the same test, the electrolytic capacitor lasted for 35 cycles.

EXAMPLE 2

A second start capacitor assembly 100 was built in accordance with start capacitor assembly 100. In this example, capacitor 102 was a metalized film capacitor having a capacitance of 119 microfarads. Resistor 104 had a resistance of 15,000 Ohms. The start capacitor assembly was coupled to a start winding of an electric motor. The test motor was a 1.5 horsepower severe duty capacitor start motor for use in farm equipment. In this test, the start capacitor assembly was tested under a 20% duty cycle. The start capacitor assembly functioned in this test environment for more than 400,000 cycles without failure. When similar capacitance electrolytic capacitors, instead of the second start capacitor assembly, were subjected to the same test, the electrolytic capacitor lasted for 60,000 cycles.

The above-described methods and apparatus provide a cost-effective and reliable start capacitor assembly for use in electric motors. The exemplary start capacitor assemblies can be used to replace traditional electrolytic start capacitors on start capacitor motors and start capacitor-run capacitor motors to provide phase shift and starting torque. The start capacitor assemblies provide a more robust and more reliable component that may not be affected by the time required for a motor to reach the rotational speed needed for the disconnection of the motor startup winding. Moreover, the methods and apparatus described herein are suitable for applications described as "Hard Start", where the motor load causes a slow starting speed, as well as motors that require very frequent start-stop cycles, where traditional electrolytic capacitors may have a poor reliability or may not be applied.

While the invention has been described in terms of various specific embodiments, those skilled in the art will recognize that the invention can be practiced with modification within the spirit and scope of the claims.

What is claimed is:

1. A start capacitor assembly for connection to an electric motor, said assembly comprising:
   a film capacitor having a first terminal and a second terminal coupled to a plurality of connection terminals, wherein said film capacitor substantially defines a capacitance of said assembly;
   a resistor electrically coupled to said film capacitor in parallel with the first terminal and the second terminal of said film capacitor by direct mechanical and electrical connection to at least two of said plurality of connection terminals; and a housing enclosing said film capacitor, wherein said resistor is positioned external to said housing and connected between at least two of said plurality of connection terminals.

2. A start capacitor assembly in accordance with claim 1, wherein said film capacitor comprises a metalized film capacitor.

3. A start capacitor assembly in accordance with claim 2, wherein said film capacitor comprises a cylindrically wound metalized film capacitor.

4. A start capacitor assembly in accordance with claim 1, wherein said plurality of connection terminals are configured for coupling said film capacitor to a start winding of an electric motor.

5. A start capacitor assembly in accordance with claim 1, wherein said plurality of connection terminals are coupled to said first terminal and said second terminal within said housing and extend from an exterior of said housing.

6. A start capacitor assembly in accordance with claim 1, wherein the plurality of connection terminals comprise quick-connect terminals.

7. A start capacitor assembly in accordance with claim 1, wherein the plurality of connection terminals comprise flying wire terminals.

8. An electric motor assembly comprising:
   an electric motor including a start winding; and
   a start capacitor assembly coupled to the start winding of said electric motor, said start capacitor assembly comprising:
      a film capacitor having a first terminal and a second terminal coupled to a plurality of connection terminals, wherein said film capacitor substantially defines a capacitance of said assembly;
      a resistor electrically coupled to said film capacitor in parallel with the first terminal and the second terminal of said film capacitor by direct mechanical and electrical connection to at least two of said plurality of connection terminals; and
      a housing enclosing said film capacitor, wherein said resistor is positioned external to said housing and connected between at least two of said plurality of connection terminals.

9. An electric motor assembly in accordance with claim 8, wherein said film capacitor comprises a metalized film capacitor.

10. An electric motor assembly in accordance with claim 8, wherein at least one of said plurality of connection terminals is coupled to the start winding of said electric motor.

11. An electric motor assembly in accordance with claim 10, wherein said plurality of connection terminals are coupled to the first terminal and the second terminal within said housing and extend from an exterior of said housing.

12. An electric motor assembly in accordance with claim 8, wherein said electric motor comprises an induction motor.

13. An electric motor assembly in accordance with claim 8, wherein said electric motor comprises a permanent split capacitor (PSC) motor.

14. An electric motor assembly in accordance with claim 8, further comprising a run capacitor coupled to said electric motor, wherein said start capacitor assembly has a capacitance greater than a capacitance of said run capacitor.

15. A method of operating an electric motor having a start winding and a run winding, said method comprising:
   connecting a start capacitor assembly to the start winding of the electric motor in series with the start winding, wherein the start capacitor assembly comprises a resistor directly mechanically and electrically connected to a plurality of connection terminals of a film capacitor enclosed within a housing, wherein the film capacitor substantially defines a capacitance of the start capacitor assembly, and wherein the resistor is positioned external to the housing and connected between at least two of the plurality of connection terminals.

16. A method in accordance with claim 15, wherein connecting the start capacitor assembly to the start winding comprises connecting a start capacitor assembly comprising a metalized film capacitor coupled in parallel to the resistor.

\* \* \* \* \*